(12) United States Patent
Gottmann et al.

(10) Patent No.: US 8,785,012 B2
(45) Date of Patent: Jul. 22, 2014

(54) FUEL CELL BYPASS DIODE STRUCTURES AND ATTACHMENT METHODS

(75) Inventors: Matthias Gottmann, Sunnyvale, CA (US); Arne Ballantine, Palo Alto, CA (US); Chockkalingam Karuppaiah, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 16 days.

(21) Appl. No.: 13/492,351

(22) Filed: Jun. 8, 2012

(65) Prior Publication Data

US 2012/0315509 A1 Dec. 13, 2012

Related U.S. Application Data

(60) Provisional application No. 61/494,937, filed on Jun. 9, 2011.

(51) Int. Cl.
*H01M 14/00* (2006.01)
*H01M 10/42* (2006.01)
*H01M 8/04* (2006.01)

(52) U.S. Cl.
CPC .......... *H01M 10/425* (2013.01); *H01M 8/0432* (2013.01); *H01M 8/0438* (2013.01)
USPC ................................ 429/7; 429/430; 429/432

(58) Field of Classification Search
CPC H01M 10/425; H01M 8/0202; H01M 8/0438
USPC ...................................... 429/7, 432
See application file for complete search history.

(56) References Cited

U.S. PATENT DOCUMENTS

| | | | |
|---|---|---|---|
| 5,964,309 A | 10/1999 | Kimura et al. | |
| 6,682,841 B1 | 1/2004 | Armstrong et al. | |
| 6,838,923 B2 | 1/2005 | Pearson | |
| 7,422,810 B2 | 9/2008 | Venkataraman et al. | |
| 8,197,978 B2 | 6/2012 | Ballantine et al. | |
| 2003/0215689 A1 | 11/2003 | Keegan | |
| 2006/0127710 A1 | 6/2006 | Schulte | |
| 2006/0147769 A1 | 7/2006 | Murphy et al. | |

(Continued)

FOREIGN PATENT DOCUMENTS

| | | | |
|---|---|---|---|
| EP | 1843423 A2 | 10/2007 | |
| JP | 11329457 | 11/1999 | |

(Continued)

OTHER PUBLICATIONS

A. Vescan et al., "Very High Temperature Opeation of Diamond Schottky Diode," Electron Device Letters, IEEE, 18 (11): 556-558, 1997.

(Continued)

*Primary Examiner* — Gary Harris
(74) *Attorney, Agent, or Firm* — The Marbury Law Group PLLC

(57) ABSTRACT

A fuel cell system includes a fuel cell stack which includes a plurality of fuel cells contacted in series by a plurality of interconnects. The various embodiments provide systems and methods for coupling a fuel cell stack with an electric bypass module within a hot zone. The bypass module may include elements for conducting a current between interconnects in a fuel cell stack and thereby bypass a failed fuel cell that has become a resistive parasitic load.

4 Claims, 15 Drawing Sheets

(56) References Cited

U.S. PATENT DOCUMENTS

| | | |
|---|---|---|
| 2008/0220301 A1* | 9/2008 | LaBreche .................... 429/23 |
| 2010/0035092 A1* | 2/2010 | Gurunathan et al. ........... 429/12 |
| 2010/0209802 A1 | 8/2010 | Armstrong et al. |

FOREIGN PATENT DOCUMENTS

| | | | |
|---|---|---|---|
| JP | 2005203254 A | | 7/2005 |
| WO | WO0049673 | | 8/2000 |
| WO | WO0245197 | A2 | 6/2002 |
| WO | WO2007056518 | A2 | 5/2007 |

OTHER PUBLICATIONS

International Search Report & Written Opinion issued in PCT Application No. PCT/US2012/041594, mailed on Jan. 30, 2013.

\* cited by examiner

FUEL CELL BYPASS DIODE STRUCTURES AND ATTACHMENT METHODS

CROSS-REFERENCE TO RELATED APPLICATIONS

This application claims the benefit of priority to U.S. Provisional Patent Application Ser. No. 61/494,937 filed Jun. 9, 2011, which is hereby incorporated herein by reference in its entirety.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

When a fuel cell fails, it becomes highly resistive. In the case of a SOFC stack, operation of the stack may continue, but the voltage of the stack is increasingly consumed by the voltage drop across the resistive interface formed by the failed cell. Bypass diodes have been used in fuel cell systems to allow current to bypass the defective fuel cell, but these diodes have been located outside of the fuel cell block or hot zone. In particular, to avoid chemical and thermal degradation of the diodes, the diodes have been located outside of the hot box portion of the system that operates at a temperature greater than about 600° C. Jumper wiring has been used to connect the fuel cells to the diodes located outside the fuel cell block.

SUMMARY

The various embodiments provide fuel cell systems including a fuel cell stack in a hot zone, the fuel cell stack including a plurality of fuel cells and a plurality of interconnects plates, and a module including a plurality of bypass devices, the module attached to the fuel cell stack and located in the hot zone.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide systems and methods for coupling a fuel cell stack with a separate bypass module within a hot zone. The bypass module may include bypass elements for conducting a current between interconnects in a fuel cell stack and thereby bypass a failed fuel cell that has become a resistive parasitic load.

The use of a bypass module enjoys several advantages over other bypass methods. A bypass module allows for encapsulation of the bypass elements outside of the fuel cell stack and without interference with the fuel cell stack assembly process. Bypass modules manufactured outside of the fuel cell stack may be tested externally to ensure proper function in advance of use or integration. Further, bypass modules containing semiconductor bypass diodes may be fabricated in the clean room conditions they may require without placing such a requirement upon the stack itself. Also, any threshold or break-down voltage of the bypass elements in a system could be controlled and changed by swapping out different bypass modules.

Figure 1A:
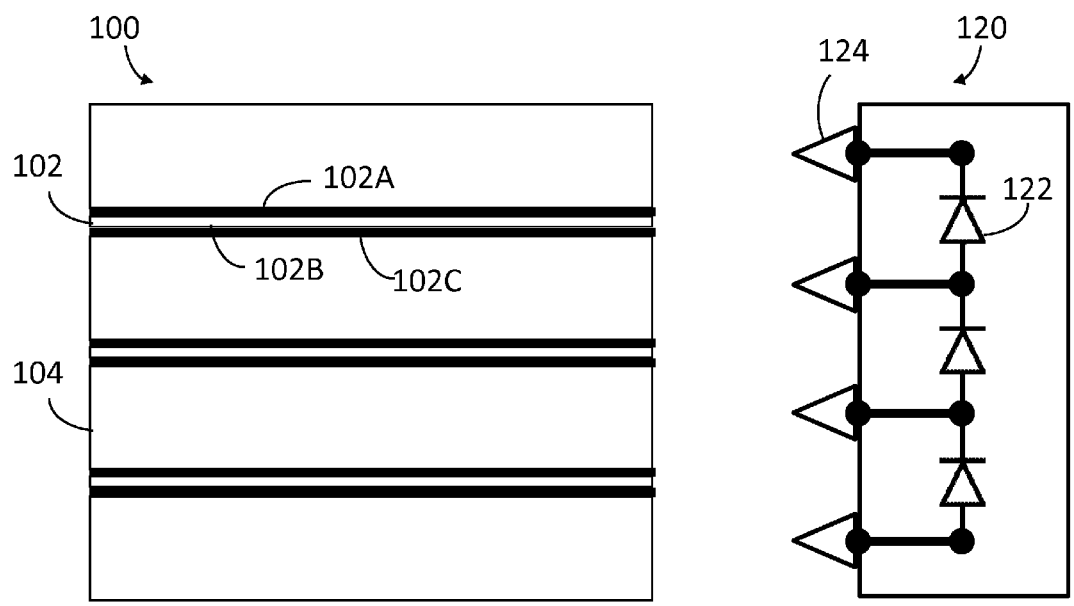
FIGS. 1A and 1B are structural side view diagrams of a fuel cell stack and a bypass module.

The term "fuel cell stack," as used herein, means a plurality of stacked fuel cells connected in series by a plurality of interconnect plates. For example, FIG. 1A includes a fuel cell stack 100 with fuel cells 102 connected in series by interconnects 104. Although the fuel cell stack in FIG. 1 is vertically oriented, fuel cell stacks may be oriented horizontally or in any other direction.

Fuel cells 102 may include an anode electrode 102A, a solid oxide electrolyte 102B, and a cathode electrode 102C. The anode electrode may comprise a cermet comprising a nickel containing phase and a ceramic phase. The nickel containing phase may consist entirely of nickel in a reduced state. This phase may form nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria. The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria. The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

Interconnect plates may separate the individual fuel cells in the stack. The interconnect plates may separate fuel, such as a hydrogen and/or a hydrocarbon fuel, flowing to the anode (fuel) electrode of one cell in the stack, from oxidant, such as air, flowing to the cathode (air) electrode of an adjacent cell in the stack. An interconnect plate may contain gas flow passages or channels between ribs. The interconnect plate may also electrically connect the anode (fuel) electrode of one cell to the cathode (air) electrode of an adjacent cell, thereby electrically connecting the cells in series. The interconnect plate may be made of or may contain electrically conductive material, such as a metal alloy (e.g., chromium-iron alloy) or an electrically conductive ceramic material, which optionally has a similar coefficient of thermal expansion to that of the solid oxide electrolyte in the cells (e.g., a difference of 0-10%). An electrically conductive contact layer, such as a nickel contact layer, may be provided between the anode electrode and the interconnect. Another optional electrically conductive contact layer may be provided between the cathode electrode and the interconnect.

The plurality of fuel cells in a fuel cell stack may share a common fuel inlet and exhaust passages or risers. A fuel cell stack may include a distinct electrical entity which contains two end plates on opposite ends of the stack which are connected to power conditioning equipment and the power (i.e., electricity) output of the stack. Thus, in some configurations, the electrical power output from such a distinct electrical entity may be controlled separately from other stacks. In other embodiments, multiple stacks may share the same end plates. In this case, the stacks may jointly comprise a distinct electrical entity.

A fuel cell stack may be part of a larger fuel cell system for generating power. The fuel cell stack may be located in a hot zone within such a system. During normal operation, this hot zone may operate at a high temperature, such as a temperature of about 600° C. or more, e.g., 600-1000° C., such as 750-950° C.

Fuel cells typically act as voltage sources in the system. However, fuel cells may have failure modes wherein the fuel cell becomes a resistive parasitic load. An electric bypass module may be coupled with a fuel cell stack. The fuel cell stack and bypass module may both be located in a hot zone. The bypass module may include elements for conducting a current between interconnects in a fuel cell stack and thereby avoid a failed fuel cell that has become a resistive parasitic load.

Figure 1B:
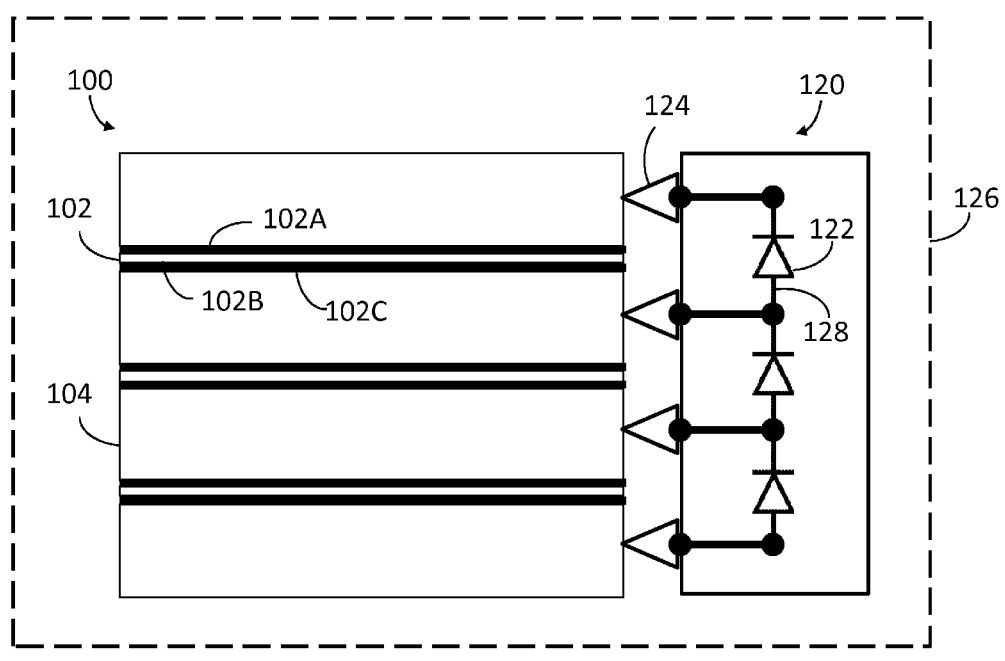

For example, FIG. 1A illustrates a fuel cell stack 100 with fuel cells 102 and interconnects 104. An electric bypass module 120 may include bypass elements 122 electrically connected to contacts 124. Bypass elements 122 are illustrated as diodes, such as semiconductor power diodes, but various embodiments may include one or more different types of bypass elements. FIG. 1B illustrates the bypass module 120 coupled with the fuel cell stack 100 such that the contacts 124 are in electrical contact with the interconnects 104. In this way, the bypass module 120 may electrically connect two or more interconnects 104 via one or more bypass elements 122. For example, in FIGS. 1A and 1B each interconnect 104 is connected to a second interconnect in electrical contact with the same fuel cell 102 via contacts 124 and a single bypass element 122. In this manner, each individual fuel cell may be bypassed. Alternate embodiments may group fuel cells or interconnects in various ways, such as bypassing two or more fuel cells or interconnects with a single bypass element 122.

In normal operation, fuel cells 102 act as voltage sources. Therefore the voltage generated by the fuel cell may hold the bypass element 122 linking the two interconnects adjacent to the fuel cell in reverse bias. Bypass elements 122 may be selected to effectively be an open circuit under this reverse bias. If a fuel cell 102 becomes defective, the cell 102 may become a highly resistive parasitic load, and a voltage drop may be formed across the defective cell. The voltage drop may be about 0.5 V to about 15 V, such as about 1 V to about 5 V. When this voltage drop exceeds a threshold voltage of the bypass element 122 (such as an "on" voltage if the bypass element is a diode), the bypass element 122 may be placed into forward bias and conduct current between the two interconnect plates 104 thereby bypassing the defective fuel cell. The threshold voltage of the bypass element 122 may vary depending on the bypass module 120 or bypass element 122 used. For example, the threshold voltage may be about 0.5 V to about 3 V, such as about 1 V. Preferably, the bypass element 122 is oriented such that the direction of the bypass current (i.e., the current conducted when the bypass element's threshold voltage is exceeded) is the same as that of a non-defective cell during normal operation. In other words, the bypass direction of the bypass element 122 is the same direction of current flow as that of a non-defective cell.

The bypass module may be effective to bypass more than one fuel cell. If multiple fuel cells fail, current may pass through multiple bypass elements (or a single bypass element 122 if it connects nonadjacent or multiple interconnects 104). If two or more failed fuel cells are next to each other, the current may bypass the fuel cells as well as the interconnects between the fuel cells.

In various embodiments, the fuel cell stack 100 and the bypass module 120 will be coupled within the hot zone and therefore exposed to high temperatures. The fuel cell stack 100 and the bypass module 120 may experience thermal expansion due to the heat. Accordingly, the bypass module 120 may be constructed of a material with a similar thermal expansion rate as the fuel cell stack 100.

In various embodiments, the hot zone may be a hot box 126, as shown in FIG. 1B. A hot box 126 may be a thermally insulated container or housing designed to operate with the high operating temperatures of a fuel cell stack 100 (e.g., above 600° C.). A hot box may contain a plurality of fuel cell stacks 100 arranged in various ways. For example, a hot box illustrated in U.S. Pat. No. 7,422,810, which is incorporated herein by reference for a teaching of a hot box and its components, may be used. A bypass module 120 may be coupled with a fuel cell stack 100 within the hot box 126.

The high temperatures of the hot zone also mean that special high temperature bypass elements may be used. Various embodiments may rely on one or more different types of bypass elements 122. For example, each bypass element 122 in the figures is illustrated as a diode. However, each bypass element 122 may be any passive or active electrical device which is capable of conducting electricity between at least two interconnects when at least one fuel cell becomes defective. If a bypass element 122 is a diode, preferably the diode does not conduct an appreciable amount of current in the reverse bias direction when the cells are not defective. Further, the diode may be capable of operating at high temperatures within the hot zone, such as about 600-1000° C. Diamond semiconductor diodes are examples of diodes which can operate with junction temperatures of up to about 1000° C. For example, the diodes disclosed by A. Vescan et al., "Very high temperature operation of diamond Schottky diode," *Electron. Device Letters, IEEE*, 18(11): 556-558 (1997), which is incorporated herein by reference in its entirety, may be used. Silicon carbide semiconductor diodes or other high temperature diodes may also be used.

Various alternative embodiments may include break-down dielectrics serving as bypass elements 122. Break-down dielectrics may have poor conductivity until a voltage equal to or greater than a break-down voltage is applied. As described above, when a fuel cell fails, it may become a strong resistive parasitic load instead of a voltage source. This change would cause a higher potential difference across a bypass element electrically attached to the interconnects on each side of the fuel cell. If the bypass element is a break-down dielectric, the higher potential difference may be greater than the break-down voltage. Therefore, the break-down dielectric may begin behaving as a conductor (e.g., due to a phase change in the dielectric) and bypass the failed fuel cell. The break-down dielectrics may be selected to break-down at a voltage of about 2 volts. Examples of bypass diode dielectrics include nickel oxide or hafnium oxide layers.

Various embodiments may include antifuses as bypass elements. An antifuse bypass element may begin with a very high resistance or even effectively be an open circuit similar to a diode under reverse bias as discussed above. However, the antifuse may create an electrically conductive path if a threshold voltage or current is exceeded. Similar to a break-down dielectric, the antifuse may bypass a fuel cell when attached to the interconnects on each side of the fuel cell and subjected to the higher potential difference caused by the fuel cell's failure. Examples of antifuses include silicon oxide or silicon nitride layers. The high potential causes a conductive link to diffuse through the antifuse dielectric 122 from the metal electrodes 128 attached on each side of the anitfuse dielectric 122 to cause the link to provide a conductive path between the electrodes through the dielectric 122.

Figures 2A, 2B:
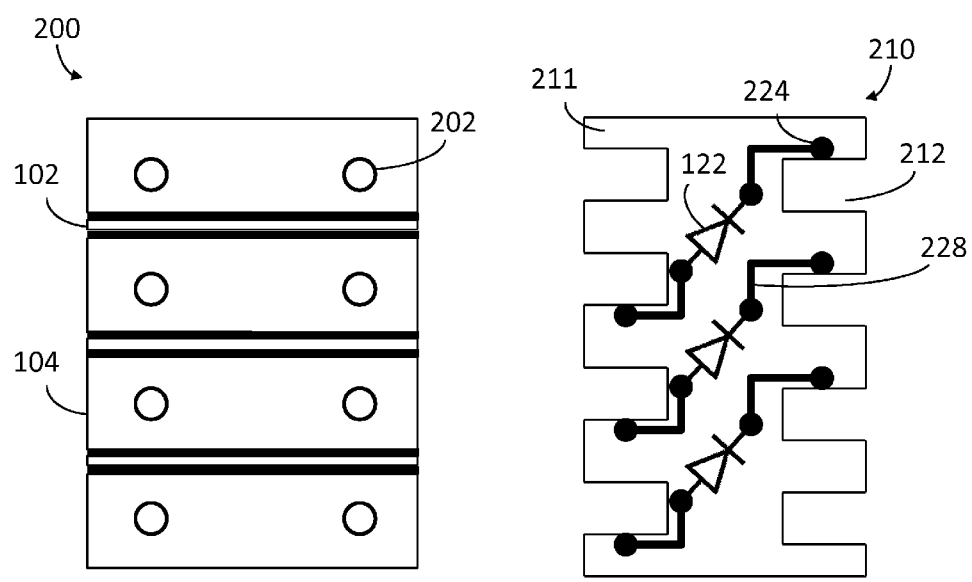
FIG. 2A is a structural diagram of a fuel cell stack with protrusions.
FIG. 2B is a structural diagram of a bypass module shaped with recesses.
Figure 2C:
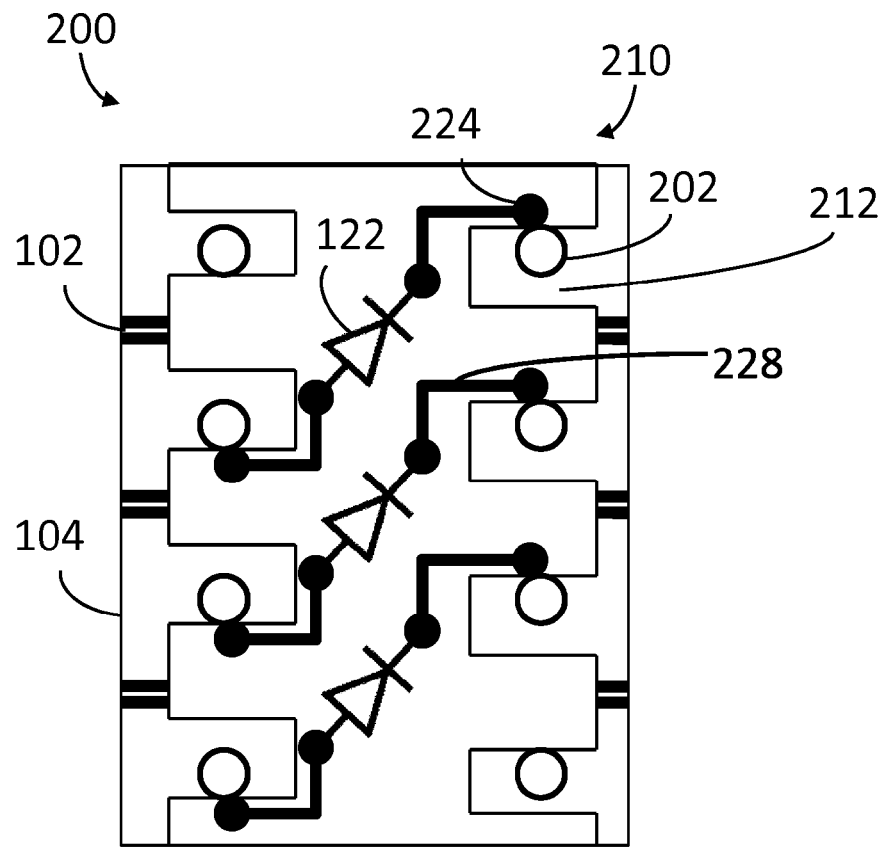
FIG. 2C is a structural diagram of the bypass module of FIG. 2B attached to the fuel cell stack of FIG. 2A.

Various embodiments may include one or more different ways of coupling the bypass module with the fuel cell stack. FIG. 2A illustrates a fuel cell stack 200 with fuel cells 102 and interconnects 104 similar to the fuel cell stack 100 of FIGS. 1A and 1B (but rotated 90 degrees around a vertical axis). However, fuel cell stack 200 may include protrusions 202 on interconnects 104 (e.g., on the edges of interconnect 104 plates). As shown, protrusions 202 may be in pairs on each interconnect 104 and offset from the center to align with other protrusions on adjacent interconnects 104. FIG. 2B illustrates a bypass module 210 having a support element 211 with recesses 212. Bypass module 210 may include bypass elements 122 with leads or traces 228 to some of the recesses 212. FIG. 2C illustrates how bypass module 210 may be attached to the fuel cell stack 200 by coupling the recesses 212 in support element 211 on to the protrusions 202. Contact between the protrusions 202 and the contact portions 224 of the leads, wires, or traces 228 going to recesses 212 may electrically connect bypass elements 122 with interconnects 104. If the leads or traces 228 of a bypass element 122 are arranged to connect two interconnects, as shown in bypass module 210, faulty fuel cells between the interconnects may be bypassed.

Various bypass modules 210 may include the support element 211, bypass elements 122 mounted on or supported in support element 211, and a plurality of contacts 224 and leads 228. The support element 211 may include a high temperature ceramic or metal (e.g., a doped ceria or stabilized zirconia, such as yttria or scandia stabilized zirconia, or a metal alloy, such as Cr—Fe alloy, for example Cr-4-6 wt % Fe alloy) which has a similar coefficient of thermal expansion (e.g., 0-10% different) to the solid oxide fuel cells and interconnects. In various embodiments the support element may be a ceramic (e.g., stabilized zirconia or doped ceria) circuit board. The support element 211 may be a plate shaped with recesses 212 on its sides such that protrusions 202 of interconnects 104 may touch the contacts portions 224 on the surface or inside of support element 211. Preferably, the module is a freestanding, prefabricated module. This means that the support element 211 containing the bypass elements 122 mounted on or supported in support element 211, and a plurality of contacts 224 and leads 228 are made separately from the fuel cell stack, and may be handled or transported as a unit separately from the fuel cell stack.

Figure 2D:
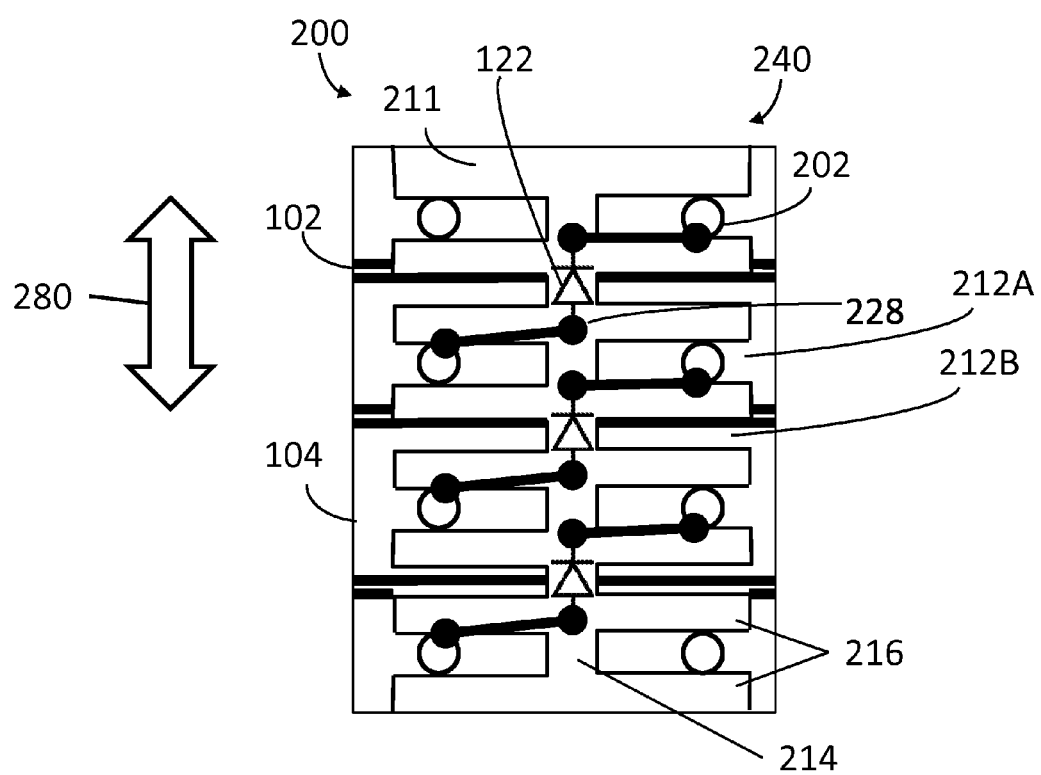
FIG. 2D is a structural diagram of an alternative bypass module attached to the fuel cell stack of FIG. 2A.

FIG. 2D illustrates a fuel cell stack 200 coupled with bypass module 240 according to an alternative embodiment. Module 240 includes a "two sided comb" shaped support element 211 comprised of a central supporting portion 214 supporting a plurality of "comb teeth" shaped extensions 216 on both sides. The adjacent extensions 216 are separated from each other by recesses 212A, 212B. Module 240 is similar to module 210, but includes additional recesses 212B that do not couple with protrusions 202 from the stack interconnects 104. In other words, recesses 212A couple with the protrusions 202. However, recesses 212B do not couple with the protrusions. Thus, every odd or even recess 212A couples with a protrusion 202 while every other even or odd recess 212B does not couple with a protrusion 202.

These additional uncoupled recesses 212B may allow the bypass module 240 to flex under stress. Specifically, the recesses 212B allow the module to flex in the stack 200 stacking direction shown by arrow 280 in FIG. 2D to clamp the teeth 216 of the support element 211 onto the protrusions 202 for support. In further embodiments, the teeth portions 216 of support element 211 may temporarily flex perpendicular to the stacking direction (i.e., in and out of the page in FIG. 2D). In alternate embodiments, the additional recesses 212B of module 240 not used to receive a protrusion 202 may be filled with flexible material, such as a high temperature metal or ceramic foam or felt, or a high temperature glass sealing material, rather than remain empty.

Figures 3A, 3B:
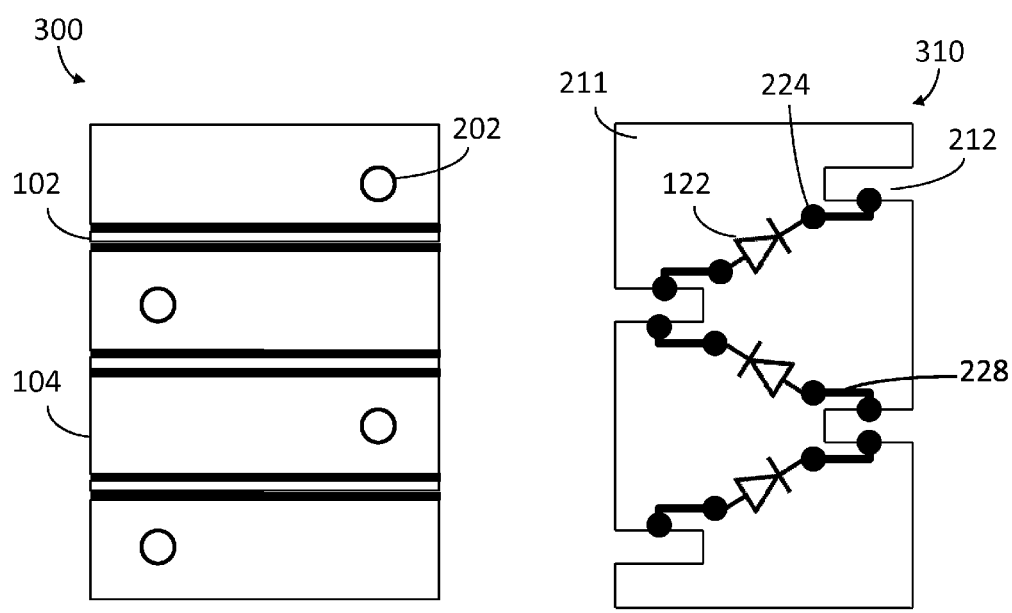
FIG. 3A is a structural diagram of a fuel cell stack with protrusions according to an alternate embodiment.
FIG. 3B is a structural diagram of a bypass module shaped with recesses according to an alternate embodiment.

FIG. 3A illustrates a fuel cell stack 300 with fuel cells 102 and interconnects 104. The fuel cell stack 300 also includes protrusions 202, but unlike fuel cell stack 200, each interconnect 104 may have only one protrusion 202. Each interconnect 104 may be manufactured with a single protrusion 202 offset from the center. When assembling the fuel cell stack 300, some of the interconnects 104 may be rotated one hundred and eighty degrees to form a pattern of protrusions 202 similar to that in FIG. 3A. Alternatively, two sets of interconnects 104 may be fabricated, the first set with a protrusion 202 offset to the right and the second set with a protrusion 202 offset to the left, and then assembled into a fuel cell stack by alternating between the two sets.

Figure 3C:
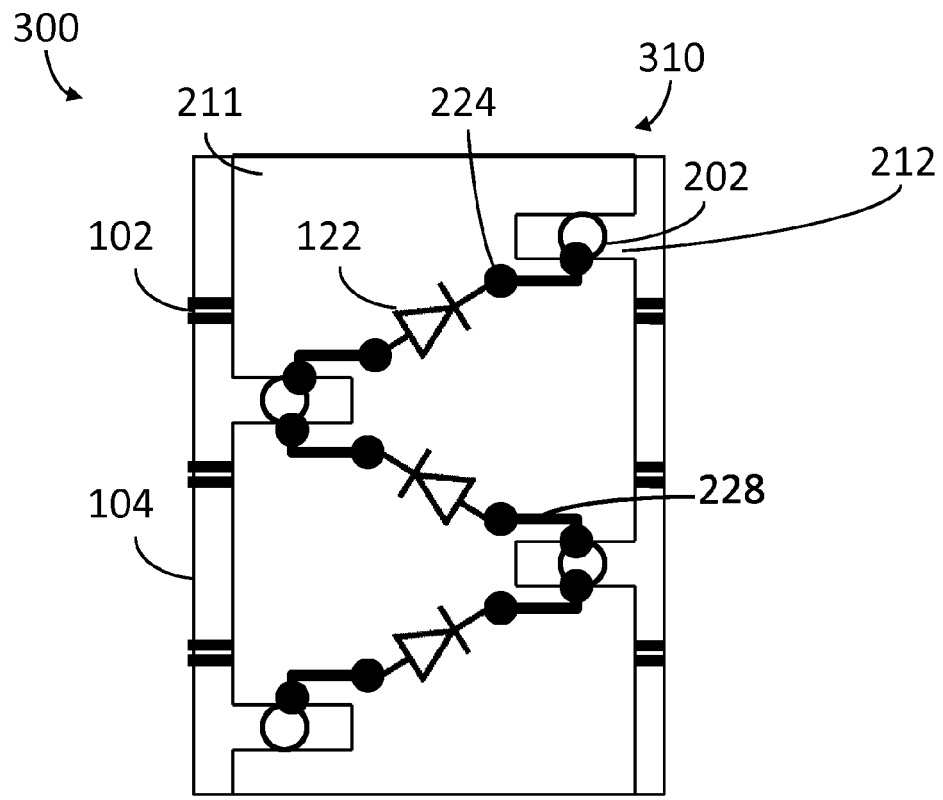
FIG. 3C is a structural diagram of the bypass module of FIG. 3B attached to the fuel cell stack of FIG. 3A.

FIG. 3B illustrates a bypass module 310 similar to bypass module 210 except for the arrangement of recesses 212 and bypass elements 122. The bypass module 310 may be shaped with recesses 212 to align with a pattern of protrusions 202 such as that in fuel cell stack 300. Recesses 212 may be staggered on the sides of support element 211 (e.g., alternating left, right, left, etc. as shown in FIG. 3B). The bypass elements 122 in bypass module 310 may be arranged with leads or traces going to recesses 212. FIG. 3C illustrates how bypass module 310 may be attached to the fuel cell stack 300 by coupling the recesses 212 with the protrusions 202. Similar to the system in FIG. 2C, the contacts 224 of leads, wires, or traces 228 may contact the protrusions 202 to electrically connect the bypass elements 122 with interconnects 104 and bypass faulty fuel cells 102.

Figure 3D:
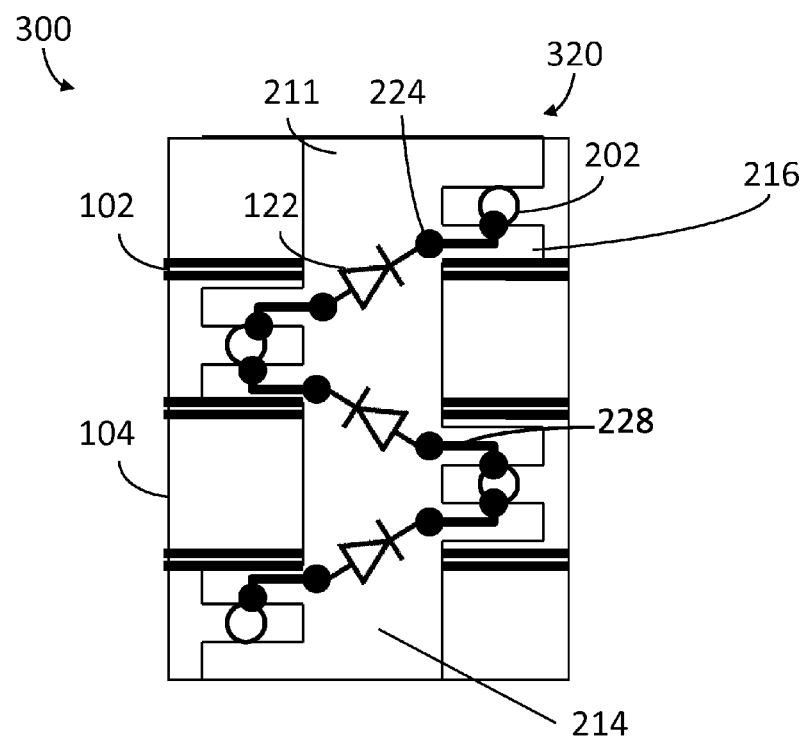
FIG. 3D is a structural diagram of an alternative bypass module attached to the fuel cell stack of FIG. 3A.

FIG. 3D illustrates an alternate embodiment bypass module 320 attached to a fuel cell stack 300 with protrusions 202. The interconnects 104 in the stack 300 may have one protrusion 202 per interconnect as shown in FIG. 3A. The bypass module 320 may include teeth 216 that flex to clamp around protrusions 202 similar to the bypass module in FIG. 2D. The central supporting portion 214 of the support element 211 may be shaped or cut out to give the teeth 216 room to flex primarily in the stack 300 stacking direction (i.e., up and down in FIG. 3D). The teeth 216 may flex any suitable amount, such as at least 3 degrees from horizontal, for example 5 to 20 degrees. The modules described herein may have any suitable dimensions which depend on the stack, interconnect and fuel cell size. For example, the height of the modules (e.g., module 320 in the up and down direction in FIG. 3D) may be 50 to 500 mm, such as 100 to 200 mm, the height of the teeth 216 (e.g., in the up and down direction in FIG. 3D) may be 0.5 to 10 mm, such as 1 to 3 mm, the width of the teeth 216 (e.g., in the left and right direction in FIG. 3D) from their edge to the central supporting portion 214 may be 10 to 100 mm, such as 25 to 50 mm, the width (e.g., in the left and right direction in FIG. 3D) of the central supporting element 214 may be 10 to 100 mm, such as 25 to 50 mm, and the thickness (e.g., in and out of the page direction FIG. 3D) may be 0.1 to 10 mm, such as 0.25 to 1 mm.

In other embodiments, support elements 211 may hang on fuel cell stack 200 or 300 by inserting protrusions 202 of interconnects 104 into recesses 212 in support element 211. Alternatively, instead of recesses 212, module 200 or 300 or support element 211 may include hooks, clamps, bolts, or other fasteners which are attached directly to interconnects 104 or to supports, such as protrusions 202 on the interconnects 104.

Figure 4A:
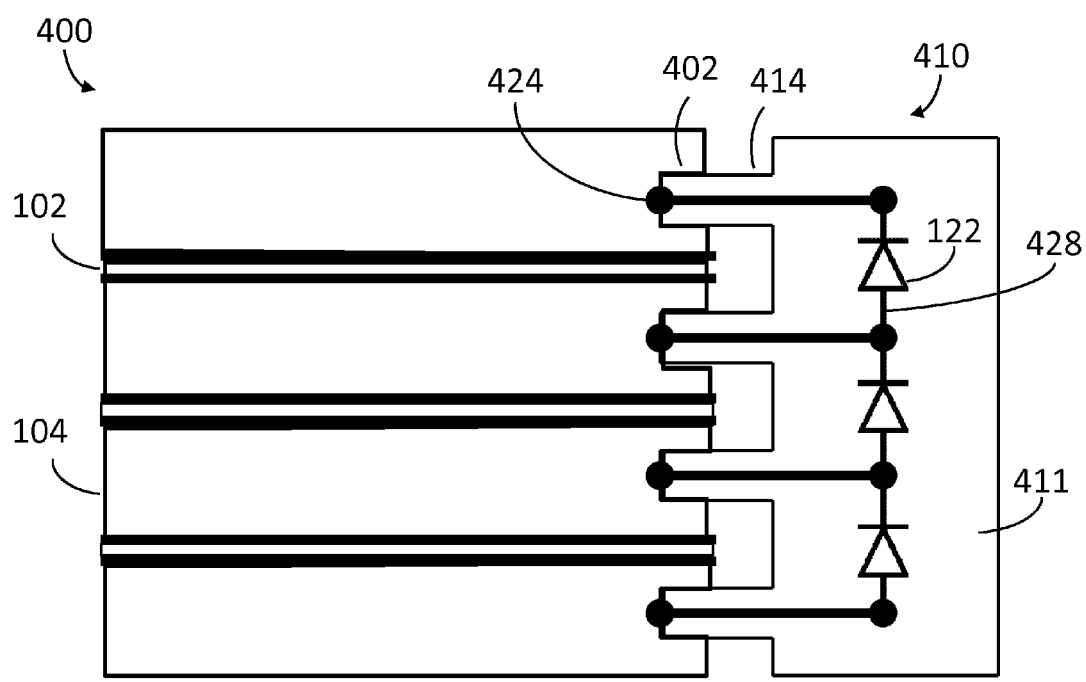
FIG. 4A is a structural diagram of a bypass module with protrusions attached to a fuel cell stack with recesses.

FIG. 4A illustrates another alternate embodiment for attaching a fuel cell stack 400 to a bypass module 410. The fuel cell stack 400 may include fuel cells 102 and interconnects 104 with recesses 402. The bypass module 410 may include protrusions 414. The bypass module 410 may also include support element 411 supporting bypass elements 122 with leads or traces 428 running in the protrusions 414. The fuel cell stack 400 and bypass module 410 may be attached to each other by coupling the protrusions 414 and the recesses 402 as shown in FIG. 4A (e.g., inserting protrusions 414 into recesses 402). The contact portions 424 of the traces, wires, or leads 428 may electrically connect the bypass elements 122 and the interconnects 104 so that faulty fuel cells may be bypassed. The contact portions 424 may be located anywhere along protrusion 414, such as at the tip.

Figure 4B:
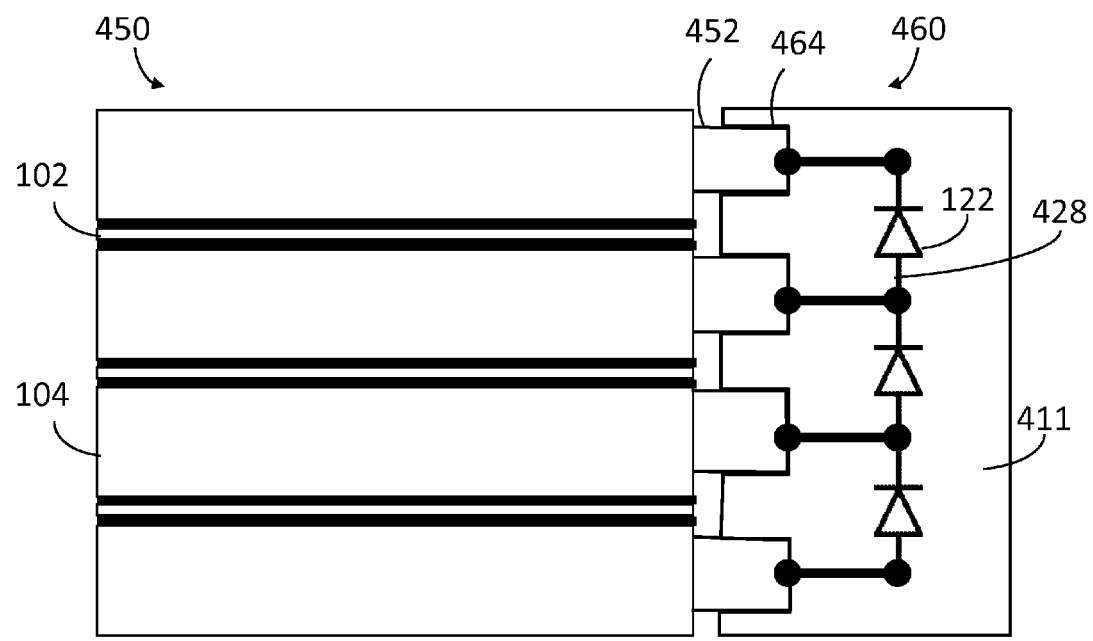
FIGS. 4B, 4C, and 4D are structural diagrams of alternative bypass modules with openings attached to a fuel cell stack with protrusions.

FIG. 4B illustrates an alternate embodiment in which a bypass module 460 includes divots 464 in the support element 411 and the fuel cell stack 450 includes interconnects 104 with protrusions 452 that may fit into the divots 464. The divots (i.e., indentations) 464 may be located in the flexible teeth of the comb shaped support element 411 to impart additional flexibility to the module 460 in the stacking direction and perpendicular to the stacking direction.

Figure 4C:
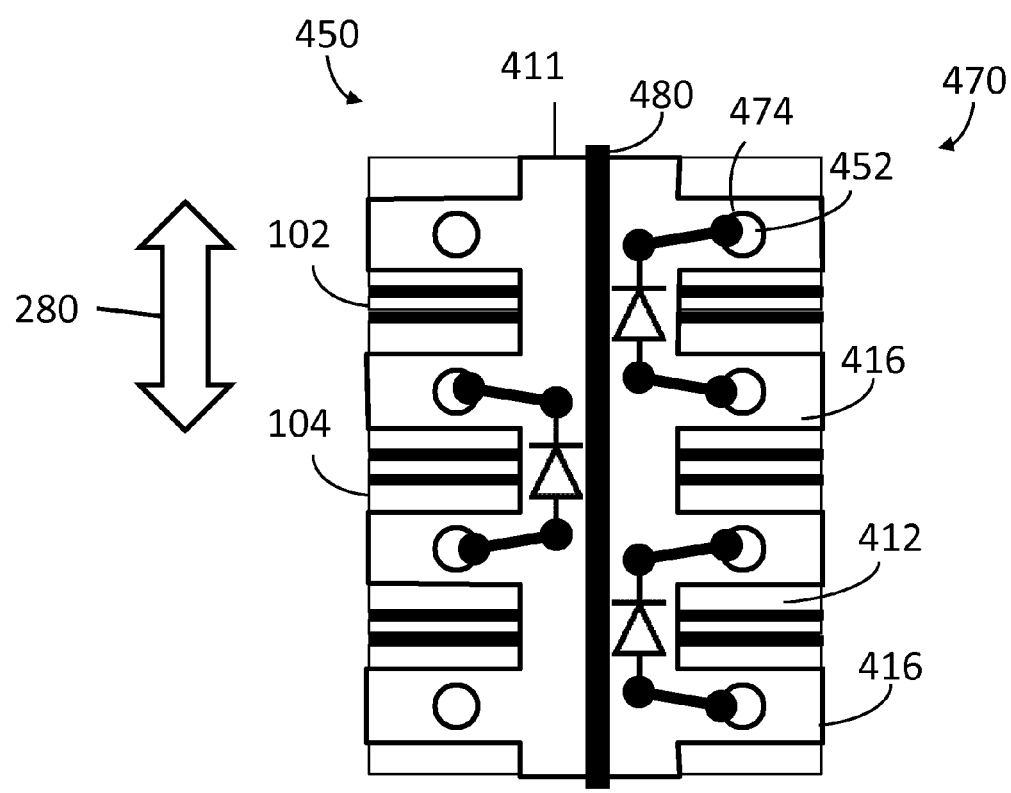

In another alternative embodiment of the module 470 shown in FIG. 4C, the divots 464 are replaced by through holes 474 which extend all the way through the support element 411. The module 470 and stack 450 shown in FIG. 4C are rotated 90 degrees around a vertical axis compared to the module and stack in FIG. 4B. Thus, the protrusions 452 extending from the interconnects 104 may extend through the bypass module support element 411. Preferably, but not necessarily, the bypass module 470 support element 411 has the two sided comb shape with recesses 412 and teeth 416 similar to modules 210 and 240 to allow the support element 411 to flex in the stack stacking direction and perpendicular to the stacking direction. The recesses 412 may be unfilled (i.e., no protrusion or material in recesses) or filled with a flexible material as described with respect to FIG. 2D above. FIG. 4C also illustrates a clamp 480 that may be used to clamp the bypass module 470 to the fuel cell stack 450.

Figure 4D:
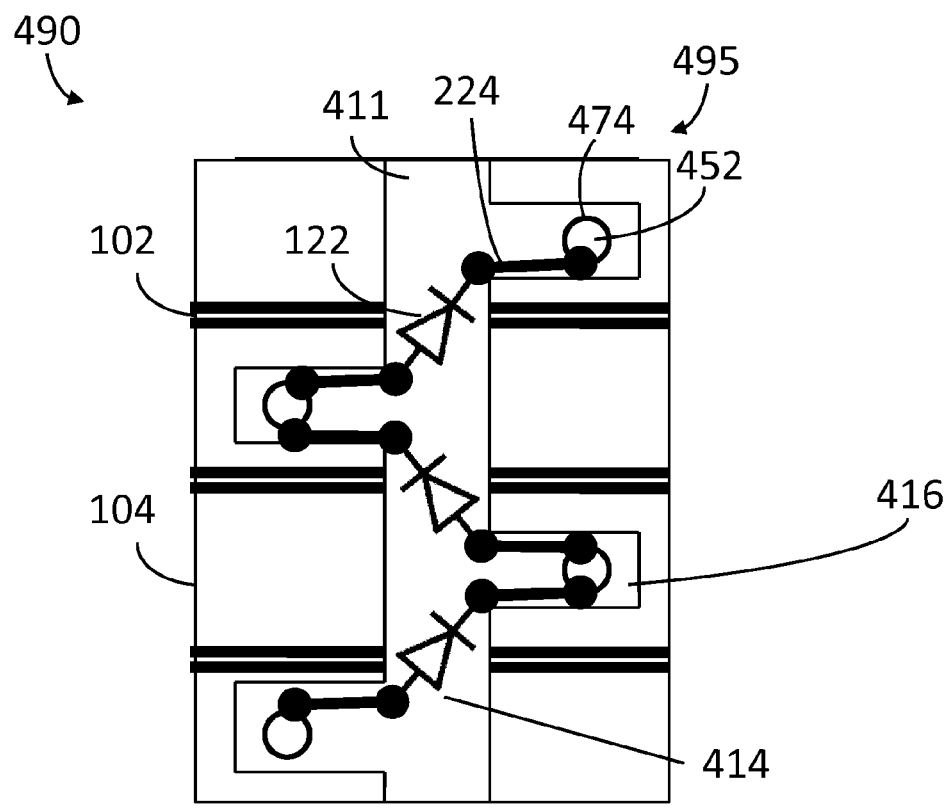

FIG. 4D illustrates an alternate embodiment bypass module 495 attached to a fuel cell stack 490. Fuel cell stack 490 may have single protrusions 452 on alternating sides of each interconnects 104, similar to the arrangement of fuel cell stack 300 shown in FIG. 3A. The bypass module 495 may have teeth 416 with through holes 474 similar to the bypass module 470 in FIG. 4C except that the teeth 416 alternate to match the single protrusions 452 on each interconnect of the stack 490. The central supporting portion 414 may be cut out similar to that shown in FIG. 2D to allow the support element 411 to flex primarily perpendicular to the stack stacking direction (i.e., in and out of the page in FIG. 4D). The element 414 and/or teeth 416 may flex independently of each other.

Figure 5:
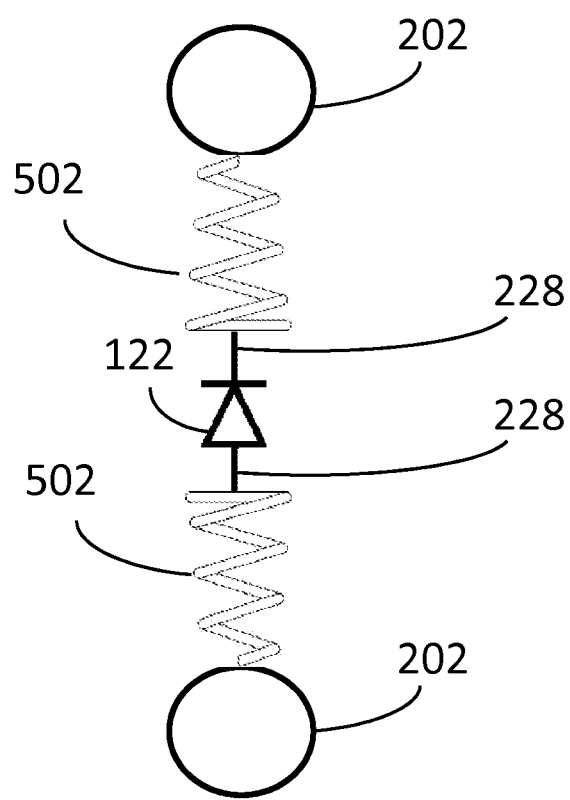
FIG. 5 is a schematic diagram of a spring connection of a bypass module to an interconnect.

Bypass modules may be held in contact with the fuel cell stack by other mechanisms. In various embodiments, the bypass module is held in contact with the fuel cell stack by one or more spring tension devices, clamps, bolts, etc. As shown in FIG. 5, bypass elements 122 may be held in electrical contact with protrusions 202 by springs 502 attached at the end of leads, wires, or traces 228. The spring 502 may be a high temperature metal (e.g., Inconel) coil spring or a high temperature metal or ceramic (e.g., stabilized zirconia) leaf spring. Various embodiments may use one or more weighted elements to press the bypass module and fuel cell stack together. Projections and recesses may be omitted with contacts 124 directly contacting exposed edges of the interconnects 104.

In various embodiments, contacts 124 or leads, wires, or traces 128 of the bypass elements 122 of a bypass module, including the alternate bypass modules with recesses or protrusions, may contact the fuel cell stack via contact points 124 coated with various conductive materials. These materials may include platinum, nickel, Inconel, or lanthanum strontium manganite (LSM).

Various embodiments may involve welding or brazing at the point of electrical contact between the bypass module and the fuel cell stack (e.g., contacts 124 may be brazed or welded to interconnects 104). Welding or brazing may improve conduction or help support and maintain contact between the fuel cell stack and the bypass module.

Further embodiments may include one or more voltage monitoring devices within the bypass module. Voltage monitoring of each of the fuel cell elements may allow for better measurements of system performance and a more precise diagnosis of any system problems. However, the benefit of monitoring more voltages is balanced against the rise in cost with each additional monitoring device. Previously, a fixed number of monitoring devices may have been selected for the entire life of a fuel cell system. Interchangeable bypass modules may allow adjusting the amount of monitoring based on the life cycle of a particular unit. For example, prototype fuel cell stack units may be coupled with bypass modules equipped with a voltage monitoring device for every fuel cell. These monitoring devices may provide voltage measurements for each cell and may aid in development. Similarly, a production unit may be coupled with a bypass module with many voltage monitoring devices prior to deployment. In this manner, bypass modules may be tested for defects prior to being attached to a fuel cell stack. The greater number of measurements allowed by such a bypass module may prevent deployment of an unreliable unit.

Alternatively, bypass modules with relatively few voltage monitoring devices may be used for other portions of the unit's life cycle, such as after deployment in the field (i.e., at the site where the unit is located to generate electricity). These bypass modules may include any number of devices for monitoring the voltage across any number of fuel cells. For example, a bypass module may include a single device to monitor the voltage across as many as one hundred fuel cells. Alternate embodiment modules may include a voltage monitoring device for each of multiple groups of fuel cells. In summary, a fuel cell stack may be tested while attached to a first bypass module having a first plurality of monitoring devices and at least one bypass element. Then the first bypass module is removed from the fuel cell stack, and a different second bypass module having at least one monitoring device and at least one bypass element is attached to the fuel cell stack. The fuel cell stack is then operated in the field to generate electricity while the fuel cell stack operation is monitored using the at least one monitoring device of the second bypass module. The first bypass module contains more monitoring devices than the second bypass module. Thus, a first module with more monitoring devices per stack is used during testing of the stack and a second module with fewer devices per stack than the first module is used during field operation (i.e., electricity generation) of the stack.

Bypass modules with different types or number of voltage monitoring devices may be used at other times in the life cycle as well. For example, fuel cell stacks performing in a critical use or other situations where failures would need to be identified quickly may have bypass modules with many voltage monitoring devices. Total stack life may be extended by using modules with many monitoring devices to identify the first cells to be replaced or repaired in units near the end of the life cycle.

Figure 6:
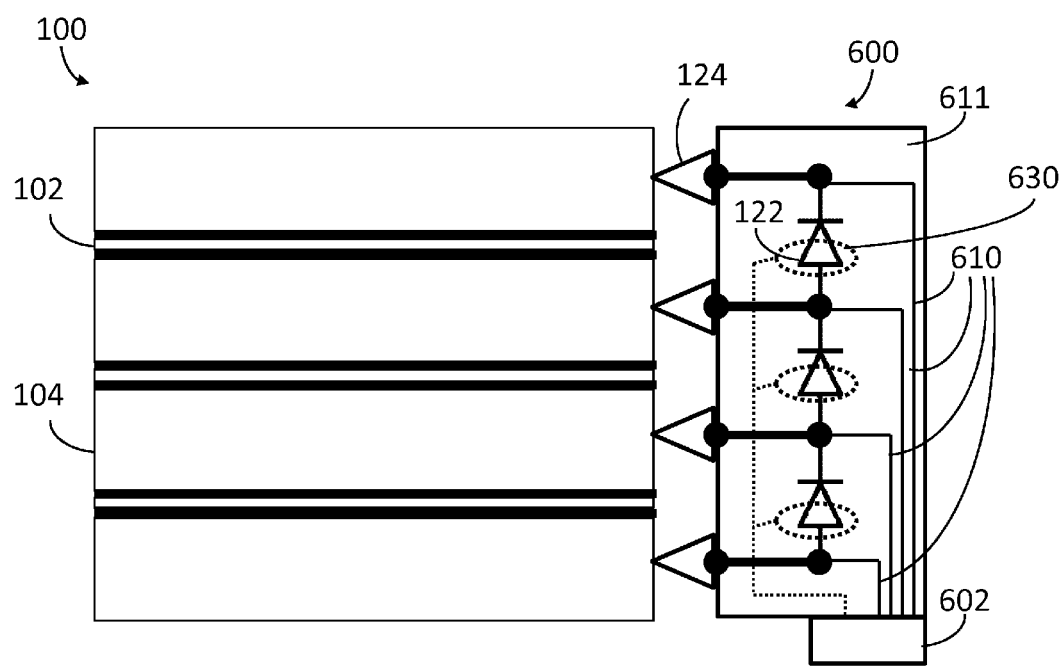
FIG. 6 is a structural side view diagram of a fuel cell stack and a bypass module with sensors according to an alternative embodiment.

Various embodiments may include different types of voltage monitoring devices. FIG. 6 illustrates a fuel cell stack 100 attached to a bypass module 600 with voltage monitoring. Voltages across the cells 102 and bypass elements 122 may be monitored by running voltage probes 610 between each bypass element. These probes 610 may be made of various different conductive materials that could withstand the temperatures of the hot zone such as Ni, Cr, etc. Probes 510 may be mounted on or supported inside support element 511. The probes 610 may be connected with a data logging unit 602 that senses and logs the voltages across each cell or bypass element. Data logging unit may be connected to an outside device (e.g., a computer) to transfer the logged voltages. Alternatively, data from the data logging unit 602 may be transmitted wirelessly to the outside device to avoid wiring to outside devices.

Although FIG. 6 illustrates voltage probes incorporated into the same module 600 as bypass elements 122, these probes may be used separately. Further embodiments include modules with voltage probes 610 but without bypass elements 122. Voltage probes 610 may be connected to one or more interconnects 104, such as every interconnect, every other interconnect, or various other patterns or random assortments. The number of probes could vary between modules. Similar to bypass elements 122, modules with more voltage probes 610 may be used during production or development for diagnostics and modules with fewer probes may be used after deployment. Alternatively, the probe wires may be spot welded to the stack rather than being connected using the module.

Further embodiments may include current loops to detect current flow through the bypass elements. These current loops 630 may be placed around one or more bypass elements 122 or groups of bypass elements 122 as shown in FIG. 6. When there is bypass current, a voltage may be induced in the current loop and detected externally. Current loops have the advantage of detecting fuel cell performance without actual contact with the fuel cell or fuel cell stack (as is usually done with a voltage probe) and therefore cannot participate in a short of the fuel cells or stack. The current loops may be attached to data logging or transmitting device similar to the data logging unit 602 discussed above or may be connected to an outside device.

Further embodiments may include high temperature transistors integrated into the bypass module to form logic gates and create a multiplexer. A multiplexer may allow monitoring of either voltage probes 610 or current loops 630 via a multiplexing input signal and allow monitoring of many cells with less signal wires passing into and out of the hot zone.

Figure 7:
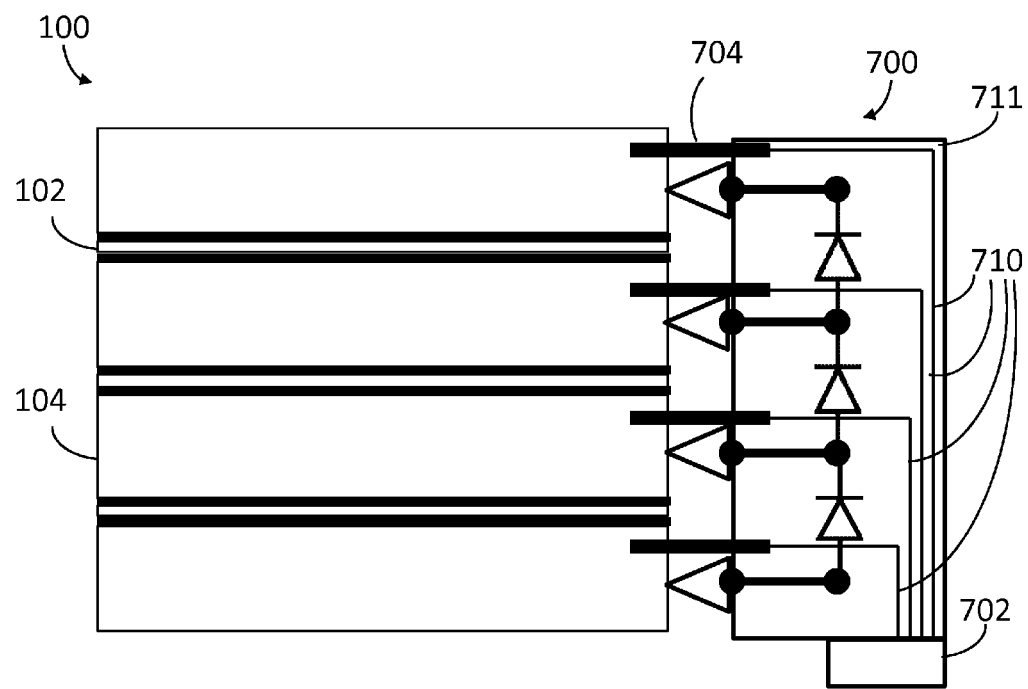
FIG. 7 is a structural side view diagram of a fuel cell stack and a bypass module with alternate sensors according to another alternative embodiment.

Various embodiments may include pressure or temperature monitoring devices integrated into the bypass module. FIG. 7 illustrates a bypass module 700 with integrated temperature and/or pressure sensors 704. These devices may connect with ports in the interconnects 104. The number of pressure or temperature monitoring devices per module may vary based on the stack's life cycle as described above for voltage monitoring devices. The sensors 704 may be connected to a data logging device 702 by probes 710. The data logging device 702 may transmit recorded pressures or temperatures via wire or wireless connection to an outside device. The sensors 704 may be mounted on or supported in a support element 611. Sensors 704 may comprise thermocouples or pressure sensors that contact the fuel cell stack or are located near the fuel cell stack.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system, comprising:
a fuel cell stack in a hot zone, the fuel cell stack comprising a plurality of fuel cells and a plurality of interconnects; and
a module comprising a plurality of bypass elements, the module attached to the fuel cell stack and located in the hot zone,
wherein at least one of the plurality of bypass elements is electrically connected to at least two of the plurality of interconnects so as to bypass at least one of the plurality of fuel cells located between the interconnects,
wherein the plurality of bypass elements are mounted on or supported inside a support element, and
wherein:
the module comprises a freestanding module and the support element comprises a support plate which has a substantially similar coefficient of thermal expansion as the fuel cell stack;
the plurality of interconnects comprise a plurality of protrusions;
the support element has a comb shape comprising flexible teeth shaped to define a plurality of recesses between the flexible teeth;
the bypass module is attached to the fuel cell stack by placing the plurality of protrusions into alternating recesses; and
recesses without a protrusion are unfilled or filled with a flexible material.

2. The system of claim 1, wherein the support element is a ceramic circuit board.

3. The system of claim 1, wherein the recesses without the protrusion are unfilled.

4. The system of claim 1, wherein the recesses without the protrusion are filled with the flexible material.

* * * * *